US012488831B2

(12) United States Patent
Jochim et al.

(10) Patent No.: US 12,488,831 B2
(45) Date of Patent: Dec. 2, 2025

(54) REMOTE DIRECT MEMORY ACCESS WITH PROCESS SYNCHRONIZATION MECHANISMS FOR VEHICLE CONTROL MODULES

(71) Applicant: GM GLOBAL TECHNOLOGY OPERATIONS LLC, Detroit, MI (US)

(72) Inventors: Markus Jochim, Troy, MI (US); Nithya Somanath, Farmington Hills, MI (US); Yuchen Zhou, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 18/411,448

(22) Filed: Jan. 12, 2024

(65) Prior Publication Data
US 2025/0232800 A1    Jul. 17, 2025

(51) Int. Cl.
*G11C 11/4091*    (2006.01)
*G11C 11/4074*    (2006.01)

(52) U.S. Cl.
CPC ...... *G11C 11/4091* (2013.01); *G11C 11/4074* (2013.01)

(58) Field of Classification Search
CPC .............. G11C 11/4091; G11C 11/4074
See application file for complete search history.

(56) References Cited

U.S. PATENT DOCUMENTS

| 12,346,269 B2* | 7/2025 | Huang ................ G06F 12/1483 |
| 2013/0007549 A1* | 1/2013 | Chan .................... G06F 30/3308 |
| | | 714/E11.167 |
| 2020/0183749 A1* | 6/2020 | Chen ...................... G06F 9/5016 |
| 2023/0229525 A1* | 7/2023 | Michaud ................ G06F 9/526 |
| | | 718/102 |

OTHER PUBLICATIONS

Ziegler, T. et al., "Design Guidelines for Correct, Efficient, and Scalable Synchronization using One-Sided RDMA", Proc. ACM Manag. Data 1, 2, Article 131, Jun. 2023, 26 pages.
Abaza, H. et al., "RDMA-Based Deterministic Communication Architecture for Autonomous Driving", 2023 IEEE 29th International Conference on Embedded and Real-Time Computing Systems and Applications (RTCSA), 2023. pp. 137-146.

(Continued)

*Primary Examiner* — Zhuo H Li

(57) ABSTRACT

A vehicle electrical architecture includes a first vehicle control module node including a first remote direct memory access (RDMA) capable network interface card and a mutex client, and a second vehicle control module node including a second RDMA capable network interface card, a mutex server, and a memory, with an Ethernet link in communication between the first and second RDMA capable network interface cards. The first vehicle control module node is configured to receive a write request for a specified memory region of the second vehicle control module node, communicate with the mutex server of the second vehicle control module node, via the mutex client, to request a mutex lock associated with the specified memory region, and in response to a notification of the mutex lock being obtained, execute an RDMA write operation to the specified memory region.

20 Claims, 7 Drawing Sheets

(56) References Cited

OTHER PUBLICATIONS

Kaur, G. et al., "Comparing Ethernet & Soft RoCE over 1 Gigabit Ethernet", International Journal of Computer Science and Information Technologies (IJCSIT), vol. 5 (1), 2014. pp. 323-327.
German Office Action from counterpart DE1020241060794, dated Feb. 5, 2025.

* cited by examiner

REMOTE DIRECT MEMORY ACCESS WITH PROCESS SYNCHRONIZATION MECHANISMS FOR VEHICLE CONTROL MODULES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to remote direct memory access with process synchronization mechanisms for vehicle control modules, including mutex lock control for memory access over Ethernet links, without relying on any RDMA network interface card hardware enhancements.

Vehicle control modules are configured to control different aspects of vehicles, based on vehicle sensor values for example. Separately, remote direct memory access (RDMA) enables read and write access to memory of a remote machine, without interrupting functions of a processor of that system. RDMA may reduce processor load and communication latency.

SUMMARY

A vehicle electrical architecture includes a first vehicle control module node including a first remote direct memory access (RDMA) capable network interface card, a mutex client, and at least one first processor, and a second vehicle control module node including a second RDMA capable network interface card, a mutex server, a memory including multiple defined memory regions, and at least one second processor. The vehicle electrical architecture includes an Ethernet link in communication between the first RDMA capable network interface card of the first vehicle control module node and the second RDMA capable network interface card of the second vehicle control module node. The first vehicle control module node is configured to receive a write request for a specified one of the multiple defined memory regions of the second vehicle control module node, communicate with the mutex server of the second vehicle control module node, via the mutex client, to request a mutex lock associated with the specified one of the multiple defined memory regions, and in response to a notification of the mutex lock being obtained, execute a remote direct memory access write operation to the specified one of the multiple defined memory regions, wherein the mutex client and the mutex server are configured to execute process synchronization for the remote direct memory access write operation without relying on supporting hardware from the first RDMA capable network interface card and the second RDMA capable network interface card.

In other features, the mutex server of the second vehicle control module node is configured to access the mutex lock by executing an atomic operation instruction.

In other features, the mutex server of the second vehicle control module node is configured to communicate a mutex lock unavailable notification to the mutex client of the first vehicle control module node, in response to the atomic operation instruction being unsuccessful.

In other features, the mutex server of the second vehicle control module node is configured to communicate a mutex lock success notification to the mutex client of the first vehicle control module node, in response to the atomic operation instruction being successful, and the mutex client is configured to communicate the mutex lock success notification to an application running on the first vehicle control module node via a memory region interface of the first vehicle control module node.

In other features, the first vehicle control module node is configured to perform at least one read operation from the specified one of the multiple defined memory regions of the second vehicle control module node, prior to executing the remote direct memory access write operation to the specified one of the multiple defined memory regions.

In other features, the first vehicle control module node is configured to receive a local write request for a specified one of the multiple defined memory regions of the second vehicle control module node, access the mutex lock by the mutex server executing an atomic operation instruction, and in response to a notification of the mutex lock being obtained, execute a local write operation to the specified one of the multiple defined memory regions.

In other features, the first vehicle control module node is configured to receive a read request for the specified one of the multiple defined memory regions of the second vehicle control module node, communicate with the mutex client of the second vehicle control module node, via the mutex server, to request a shared mutex lock associated with the specified one of the multiple defined memory regions, and in response to a notification of the shared mutex lock being obtained, execute a remote direct memory access read operation to the specified one of the multiple defined memory regions.

In other features, the second vehicle control module node is configured to receive a local read request for the specified one of the multiple defined memory regions of the second vehicle control module node, access the shared mutex lock, via the mutex server, and in response to a notification of the shared mutex lock being obtained, execute a local read operation to the specified one of the multiple defined memory regions.

In other features, the shared mutex lock is a non-exclusive lock configured to be held by multiple nodes at a same time.

In other features, the second vehicle control module node is configured to create multiple memory buffers each associated with a corresponding one of the multiple defined memory regions, and register each of the multiple memory buffers with the second RDMA capable network interface card.

In other features, the first vehicle control module node is configured to create multiple memory buffers each associated with a corresponding one of the multiple defined memory regions, and register each of the multiple memory buffers with the first RDMA capable network interface card.

In other features, the first vehicle control module node is configured to execute the RMDA write operation to control automated braking of a vehicle including the first vehicle control module node.

In other features, the first vehicle control module node is configured to execute the RMDA write operation to control automated damping of one or more shock absorbers of a vehicle including the first vehicle control module node.

In other features, the first vehicle control module node is configured to execute the RMDA write operation to transmit a fault detection notification to the second vehicle control module node.

A vehicle electrical architecture includes a first vehicle control module node including a first remote direct memory access (RDMA) capable network interface card, a mutex client, and at least one first processor, and a second vehicle control module node including a second RDMA capable network interface card, a mutex server, a memory including multiple defined memory regions, and at least one second processor. The vehicle electrical architecture includes an Ethernet link in communication between the first RDMA capable network interface card of the first vehicle control module node and the second RDMA capable network interface card of the second vehicle control module node. The second vehicle control module node is configured to receive a local write request for a specified one of the multiple defined memory regions of the second vehicle control module node, access a mutex lock associated with the specified one of the multiple defined memory regions, by the mutex server executing an atomic operation instruction, and in response to a notification of the mutex lock being obtained, execute a local write operation to the specified one of the multiple defined memory regions, wherein the mutex client and the mutex server are configured to execute process synchronization for the local write operation without relying on supporting hardware from the first RDMA capable network interface card and the second RDMA capable network interface card.

In other features, the second vehicle control module node is configured to receive a read request for the specified one of the multiple defined memory regions of the second vehicle control module node, communicate with the mutex server of the second vehicle control module node, via the mutex client, to request a shared mutex lock associated with the specified one of the multiple defined memory regions, and in response to a notification of the shared mutex lock being obtained, execute a remote direct memory access (RMDA) read operation to the specified one of the multiple defined memory regions.

In other features, the second vehicle control module node is configured to receive a local read request for the specified one of the multiple defined memory regions of the second vehicle control module node, access the shared mutex lock, via the mutex server, and in response to a notification of the shared mutex lock being obtained, execute a local read operation to the specified one of the multiple defined memory regions.

In other features, the shared mutex lock is a non-exclusive lock configured to be held by multiple nodes at a same time.

In other features, the second vehicle control module node is configured to create multiple memory buffers each associated with a corresponding one of the multiple defined memory regions, and register each of the multiple memory buffers with the second RDMA capable network interface card.

In other features, the first vehicle control module node is configured to create multiple memory buffers each associated with a corresponding one of the multiple defined memory regions, and register each of the multiple memory buffers with the first RDMA capable network interface card.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some example embodiments described herein enhance remote direct memory access (RDMA) by providing a software mechanism for synchronizing processes located on different nodes (e.g., different ECUs) of a vehicle control module. The different nodes may be connected via RDMA, for example, in the context of automotive software frameworks such as AUTOSAR. Example RDMA control processes may coordinate access to memory and inhibit or prevent race conditions.

In some examples, the multiple nodes of the vehicle control system enable synchronized access to memory in an RDMA setting, such as by integrating semaphores with an RDMA over converged Ethernet (RoCE) network interface card (NIC). The process synchronization mechanism may not include or require any RDMA network interface card enhancements to achieve task synchronization/coordinated access to shared resources (e.g., the system may work with a standard RDMA network interface card).

Since example process synchronization mechanisms are software based and may not rely on any RDMA network interface card hardware enhancements for task synchronization, the process synchronization mechanisms can be used both settings where all nodes are equipped with RoCE NICs, and in hybrid settings where some of nodes are equipped with RoCE NICs while other nodes use SoftRDMA and non-RoCE compliant NICs. This may reduce latency for data transmission in time critical vehicle control functions, such as automated emergency braking, wheel height sensing for active damping, fault detection between primary and secondary processors for brake-by-wire systems, etc.

Figure 1:
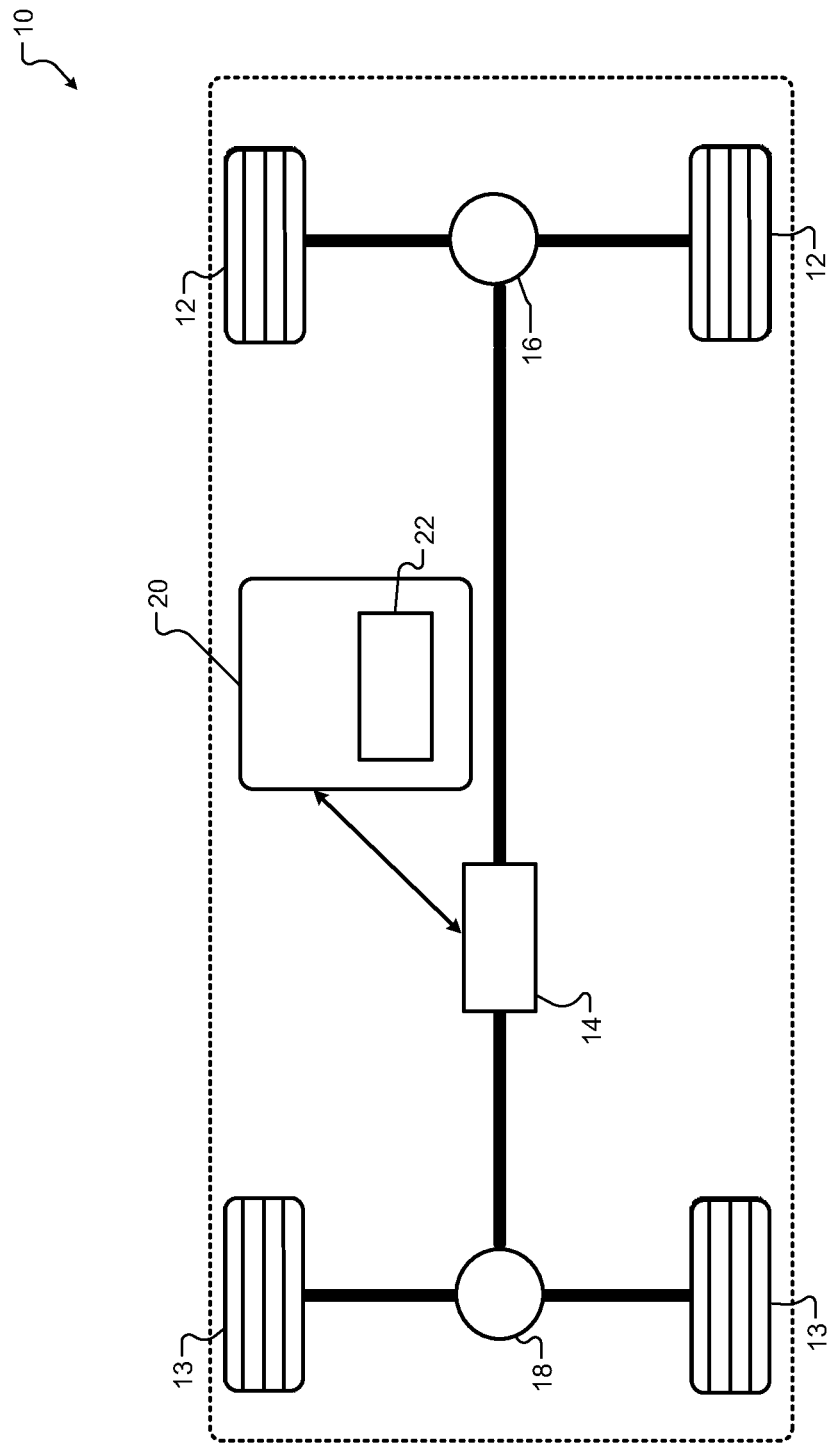
FIG. 1 is a diagram of an example vehicle including remote direct memory access for a vehicle control module.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle electrical architecture 20 (which may include one or more nodes, control modules or electronic control units (ECUs), which may be connected via communication links), may be configured to control operation of one or more vehicle components, such as the drive unit 14 (e.g., by commanding torque settings of an electric motor of the drive unit 14). The vehicle electrical architecture 20 may receive inputs for controlling components of the vehicle, such as signals received from a steering wheel, an acceleration pedal, a brake pedal, etc. The vehicle electrical architecture 20 may monitor telematics of the vehicle for safety purposes, such as vehicle speed, vehicle location, vehicle braking and acceleration, etc.

The vehicle electrical architecture 20 may receive signals from any suitable components for monitoring one or more aspects of the vehicle, including one or more vehicle sensors (such as cameras, microphones, pressure sensors, steering wheel position sensors, braking sensors, location sensors such as global positioning system (GPS) antennas, wheel height and/or position sensors, accelerometers, etc.). Some sensors may be configured to monitor current motion of the vehicle, acceleration of the vehicle, braking of the vehicle, current steering direction of the vehicle, current height and/or position of one or more wheels, etc.

As shown in FIG. 1, the vehicle electrical architecture 20 includes at least one Ethernet link 22, which may enable communication between various nodes of the vehicle control module. For example, a first node of the vehicle electrical architecture 20 may be located adjacent a sensor (e.g., wheel height sensor), a second node of the vehicle electrical architecture 20 may be located in a central processing portion for executing control algorithms based on data received from the sensor node, a third node of the vehicle electrical architecture 20 may be located at a vehicle control component (e.g., electronic shock absorber of an active damping system), to control movement or other aspects of the vehicle according to computations from another node. Each node may communicate with other nodes via the Ethernet link(s) 22 (or other suitable communication implementations).

The vehicle electrical architecture 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WWAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2V) communication, the vehicle 10 may include one or more V2X transceivers (e.g., V2X signal transmission and/or reception antennas).

Figure 2:
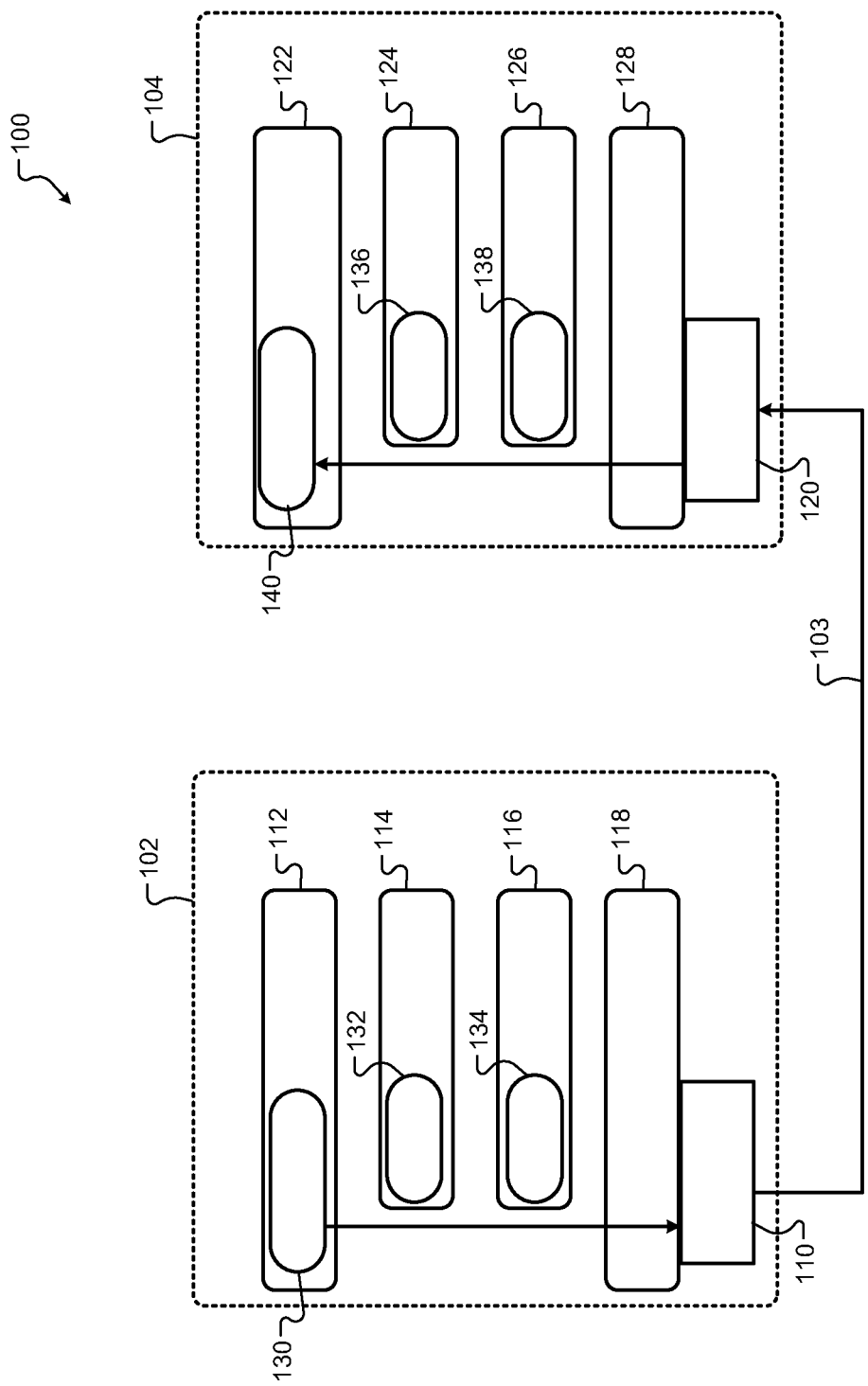
FIG. 2 is a block diagram of example remote direct memory access over a converged Ethernet link.

FIG. 2 is a block diagram of example remote direct memory access over a converged Ethernet link. The system 100 includes a server-initiator 102, and a server-target 104, which are connected by an Ethernet link 103. As shown in FIG. 2, the server-initiator 102 includes an application 112, sockets 114, a transport protocol driver 116, and an RDMA over converged Ethernet (RoCE) network interface card (NIC) driver 118. An RoCE NIC 110 is controlled by the Ethernet (RoCE) network interface card (NIC) driver 118. Although FIG. 2 refers to RoCE NICs, other example embodiments may include other variants of RDMA, may include other variants of Ethernet based protocols, or other communication systems.

The application 112 includes a buffer 130, the sockets 114 include a buffer 132, and the transport protocol driver 116 includes a buffer 134. As shown in FIG. 2, the buffer 130 of the application 112 may transmit data directly to the RoCE NIC 110 for transmission via the Ethernet link 103, bypassing the buffers of the other layers to decrease latency of data transmission in an RDMA implementation, which may make execution of software in these layers unnecessary. For example, the protocol layers (e.g., sockets 114 and transport protocol driver 116) and their buffers 132 and 134 may not be needed at all in a non-RoCE environment. In some examples, a corresponding processing unit (e.g., MCU, CPU or similar) may not use time executing such software layers. While FIG. 2 illustrates an example including several software protocol layers, example embodiments may include many software protocol layers in protocol stacks (e.g., in TCP/IP protocol stacks), which may not be required in an RoCE setting.

The server-target 104 includes an application 122, sockets 124, a transport protocol driver 126, and an RDMA over converged Ethernet (RoCE) network interface card (NIC) driver 128. An RoCE NIC 120 is controlled by the Ethernet (RoCE) network interface card (NIC) driver 128.

The application 122 includes a buffer 140, the sockets 124 include a buffer 136, and the transport protocol driver 126 includes a buffer 138. As shown in FIG. 2, the buffer 140 of the application 122 may receive data directly from the RoCE NIC 120, bypassing the buffers of the other layers to decrease latency of data reception in an RDMA implementation. In some examples, the server-initiator 102 and the server-target 104 may use an RoCE V1 Ethernet link layer protocol, for in-vehicle network operations.

The server-initiator 102 may read and write data from a memory of the server-target 104 using any suitable RDMA algorithm. For example, two-sided send and receive message passing paradigm may be implemented where a sender has a work request with a pointer to a buffer to be sent. A receiver's work request may include a pointer to an empty receive buffer. Both the sender and the receiver are actively involved and issue RDMA work requests.

In another example, a one-sided read and write implementation may allow a requester system A to read from a remote memory on system B or write to the remote memory on system B. In this example, a CPU of system A is active to issue work requests, while a CPU of system B may be passive (e.g., no CPU cycles are used, no indication is provided to the CPU that new data was written to memory of system B, etc.). In this example, read and write requests may require virtual memory addresses of system B, and a memory registration key for system B.

In some mutex variable implementations, RDMA processes may not work properly when code used to check the value of a mutex (e.g., 0 is unlocked), and the increment the mutex (e.g., to 1 for a lock), may lead to race conditions.

Atomic operations (e.g., non-interruptible) may be used to implement a mutex, such as an ARM A64 assembler instruction for a compare-and-swap (CASP). In an RDMA setting, where two or more computer access shared memory, atomic assembler instructions may not be directly accessible to remote nodes.

Figure 3:
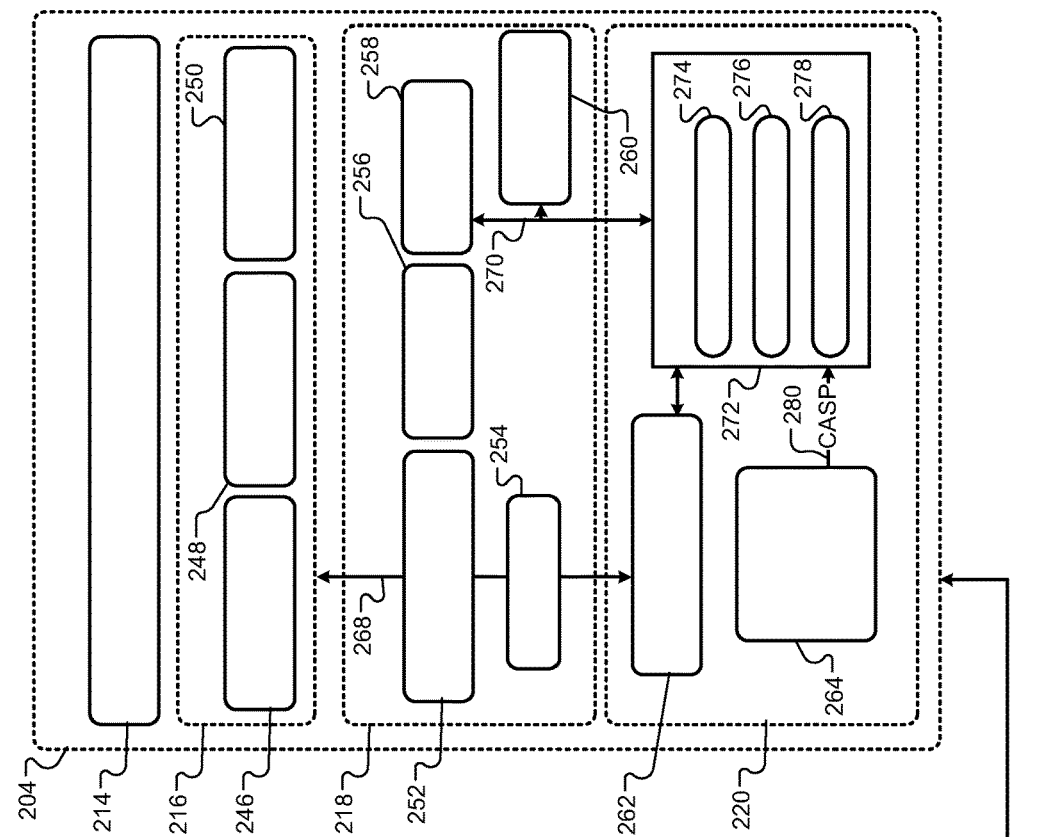
FIG. 3 is a block diagram of example remote direct memory access between two nodes of a vehicle control module.
Figure 3:
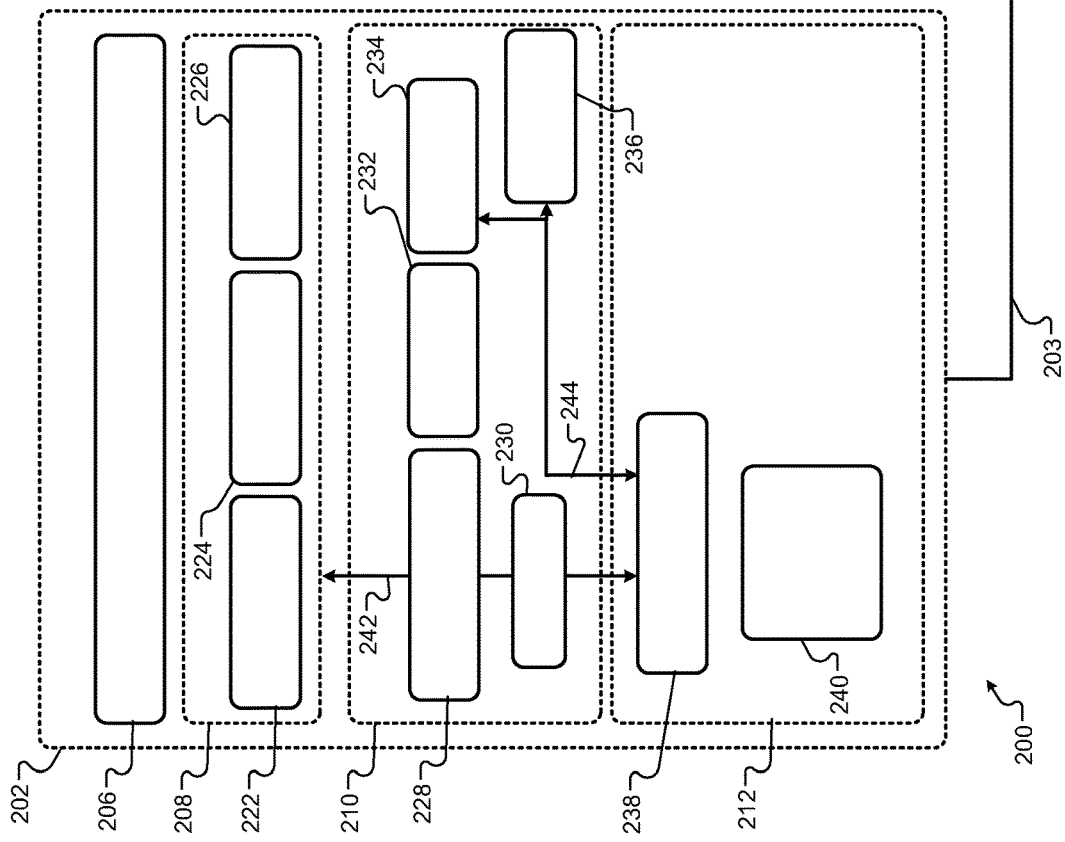

FIG. 3 is a block diagram of example remote direct memory access between two nodes of a vehicle electrical architecture 200 (which may be implemented as the vehicle electrical architecture 20 of FIG. 1). As shown in FIG. 3, the vehicle control module includes a first vehicle control module node 202, and a second vehicle control module node 204. The first vehicle control module node 202 and the second vehicle control module node 204 may correspond to different portions of a same vehicle control module, different control portions of an overall control system for the vehicle, etc.

For example, one of the first vehicle control module node 202 and the second vehicle control module node 204 may be associated with a vehicle sensor, one may be associated with a computation center, one may be associated with an actuator or other control element of the vehicle, etc. As shown in FIG. 3, the first vehicle control module node 202 and the second vehicle control module node 204 are in communication via an Ethernet link 203, although other example embodiments may use other suitable forms of communication between nodes.

The first vehicle control module node 202 includes application software 206, a runtime environment 208, and a basic software environment 210. The second vehicle control module node 204 includes application software 214, a runtime environment 216, and a basic software environment 218. The runtime environments 208 and 216 may include any suitable runtime environments for vehicle control, such as an AUTOSAR runtime environment. The basic software environments 210 and 218 may include any suitable basic software environments for vehicle control, such as AUTOSAR basic software.

The runtime environment 208 includes a memory region M1 interface 222, a memory region M2 interface 224, and a memory region M3 interface 226. Similarly, the runtime environment 216 includes a memory region M1 interface 222, a memory region M2 interface 224, and a memory region M3 interface 226. For example, the second vehicle control module node 204 may include a memory 272 including multiple defined memory regions, including an M1 memory region 274, an M2 memory region 276, and an M3 memory region 278, which may be the same or different sizes. In some examples, a different mutex variable may be associated with each memory region (e.g., mutex MX1, mutex MX2, and mutex MX3). Each memory region interface may include any suitable interface such as an AUTOSAR RTE interface for access to memory regions M1 to M3.

The first vehicle control module node 202 includes an ECU hardware region 212, and the second vehicle control module node 204 includes an ECU hardware region 220. The ECU hardware region 212 includes a remote direct memory access (RDMA) over converged Ethernet (RoCE) network interface card (NIC) 238, and one or more processors 240.

The ECU hardware region 220 includes an RoCE NIC 262 and one or more processors 264. For example, the RoCE NIC 238 and the RoCE NIC 262 may include network interface cards or ports which are capable of communicating via RDMA over converged Ethernet, such as the Ethernet link 203. The one or more processors 264 may be configured to execute an atomic compare-and-swap (CASP) instruction 280, to attempt to obtain a mutex lock associated with a target one of the multiple memory regions of the memory 272.

The basic software environment 210 includes an R-mutex client 232, and the basic software environment 218 includes an R-mutex server 256. The R-mutex client 232 is configured to enable the first vehicle control module node 202 to request locking or unlocking of a mutex associated with a memory region of the second vehicle control module node 204. The R-mutex server 256 is configured to enable the second vehicle control module node 204 to lock or unlock mutex variables on behalf of the first vehicle control module node 202, or for use by the second vehicle control module node 204.

The basic software environment 210 includes an RDMA data channel configuration module 228, and the basic software environment 218 includes an RDMA data channel configuration module 252. Each RDMA data channel configuration may be configured to enable application software to configure RDMA data channels, such as an RDMA data channel 242 in the first vehicle control module node 202, and an RDMA data channel 268 in the second vehicle control module node 204. This may include configuring queue pairs, protection domains, keys, etc.

The basic software environment 210 includes an RDMA write module 234 and an RDMA read module 236. The RDMA write module 234 is configured to enable the application software 206 on the first vehicle control module node 202 to execute an RDMA write operation through the RDMA data channel 244, and write to the memory 272 located on the second vehicle control module node 204. The RDMA read module 236 is configured to allow the application software 206 to execute an RDMA read operation through the RDMA data channel 244 to read from the memory 272 located on the second vehicle control module node 204. As shown in FIG. 3, the basic software environment 210 includes an RDMA application programming interface (API) 230, such as a uverbs API for standardized RDMA operations.

The basic software environment 218 includes a local write module 258 and a local read module 260, which may be configured to allow the application software 214 to perform local read and write operations to the memory 272 on the second vehicle control module node 204 (e.g., via the data channel 270).

Figure 4:
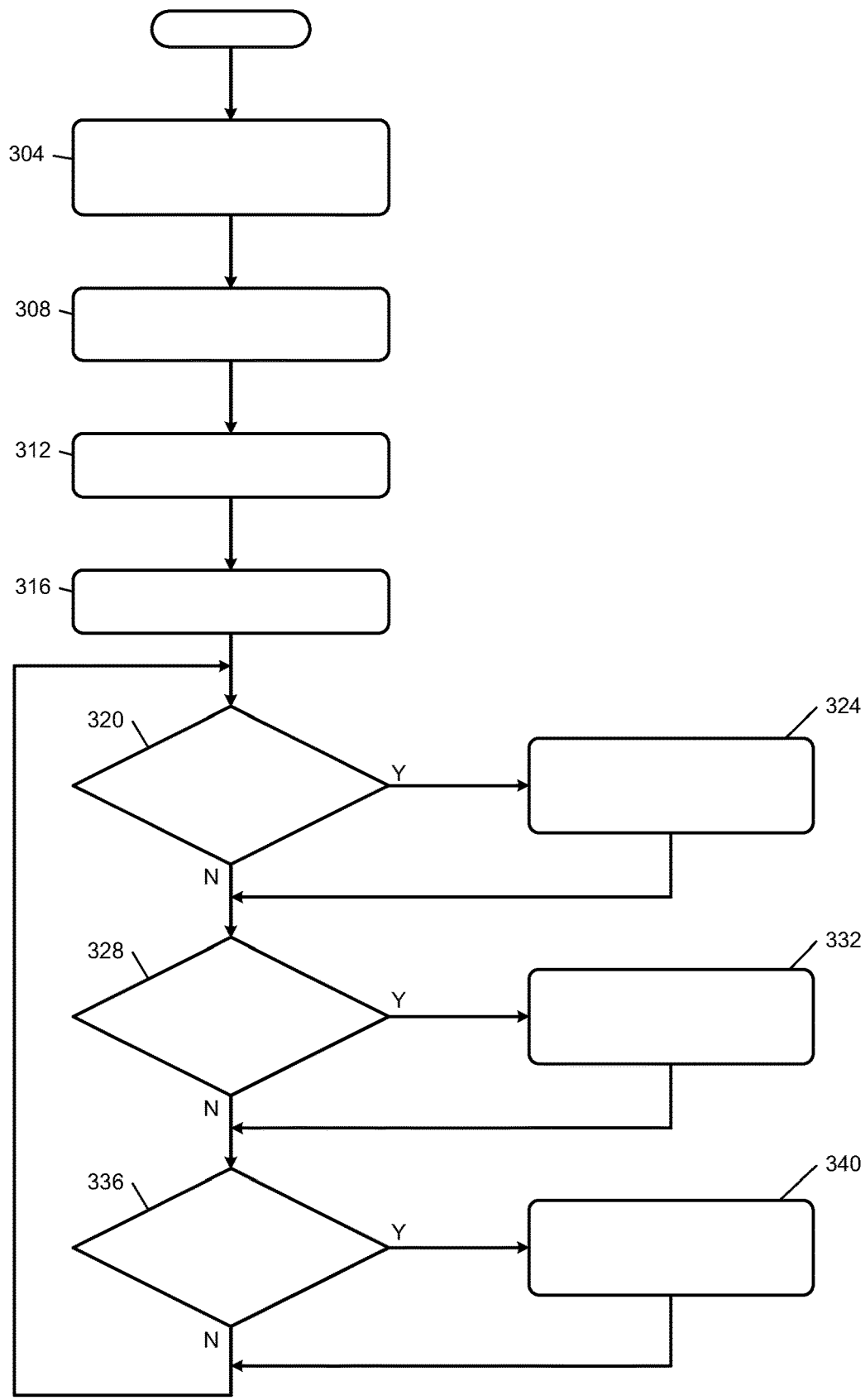
FIG. 4 is a flowchart depicting an example process for remote direct memory access between two vehicle control module nodes.

FIG. 4 is a flowchart depicting an example process for remote direct memory access between two vehicle control module nodes. The process may be performed by, for example, the vehicle electrical architecture 20 of FIG. 1 or the first vehicle control module node 202 and the second vehicle control module node 204 of FIG. 3. At 304, the process begins by configuring remote direct memory access (RDMA) for each vehicle control module node, which may occur via one or more applications of the vehicle control module nodes.

At 308, the vehicle electrical architecture is configured to create multiple memory buffers, such as multiple memory buffers in each vehicle control module node. At 312, the vehicle electrical architecture is configured to register the multiple memory buffers with RDMA over converged Ethernet (RoCE) network interface cards (NICs). Control then creates queue pairs at 316.

In some examples, applications in each node may configure RDMA via an RDMA data channel config module, such as by using a uverbs interface. This may include, but is not limited to, creating multiple memory buffers, registering memory with RoCE NICs, creating queue pairs, etc.

Control determines at 320 whether a first vehicle control module node is requesting to a remote write to memory in a second vehicle control module node. If so, control proceeds to 324 to perform a remote data write operation using a mutex. Further details describing an example remote data write operation are described further below with reference to FIG. 5.

At 328, control determines whether a second vehicle control module node is requesting to write to memory in the second vehicle control module node. If so, control proceeds to 332 to perform a local node data write operation using the mutex. Further details describing an example local data write operation are described further below with reference to FIG. 6.

At 336, control determines whether either the first vehicle control module node or the second vehicle control module node is requesting to read data from the memory of the second vehicle control module node. If so, control performs a remote or local node data read operation, at 340. Further details of an example, read operation (local or remote) are described further below with reference to FIG. 7.

Although FIG. 4 illustrates steps of the example process in a sequential order, in example embodiments the need to execute read/write operations may occur asynchronously on different nodes, or even at the same moment in time. The steps in the example processes described herein (e.g., as illustrated in FIGS. 4-7), are not limited to sequential operation, and various steps may occur asynchronously on different nodes, or at the same moment in time.

Figure 5:
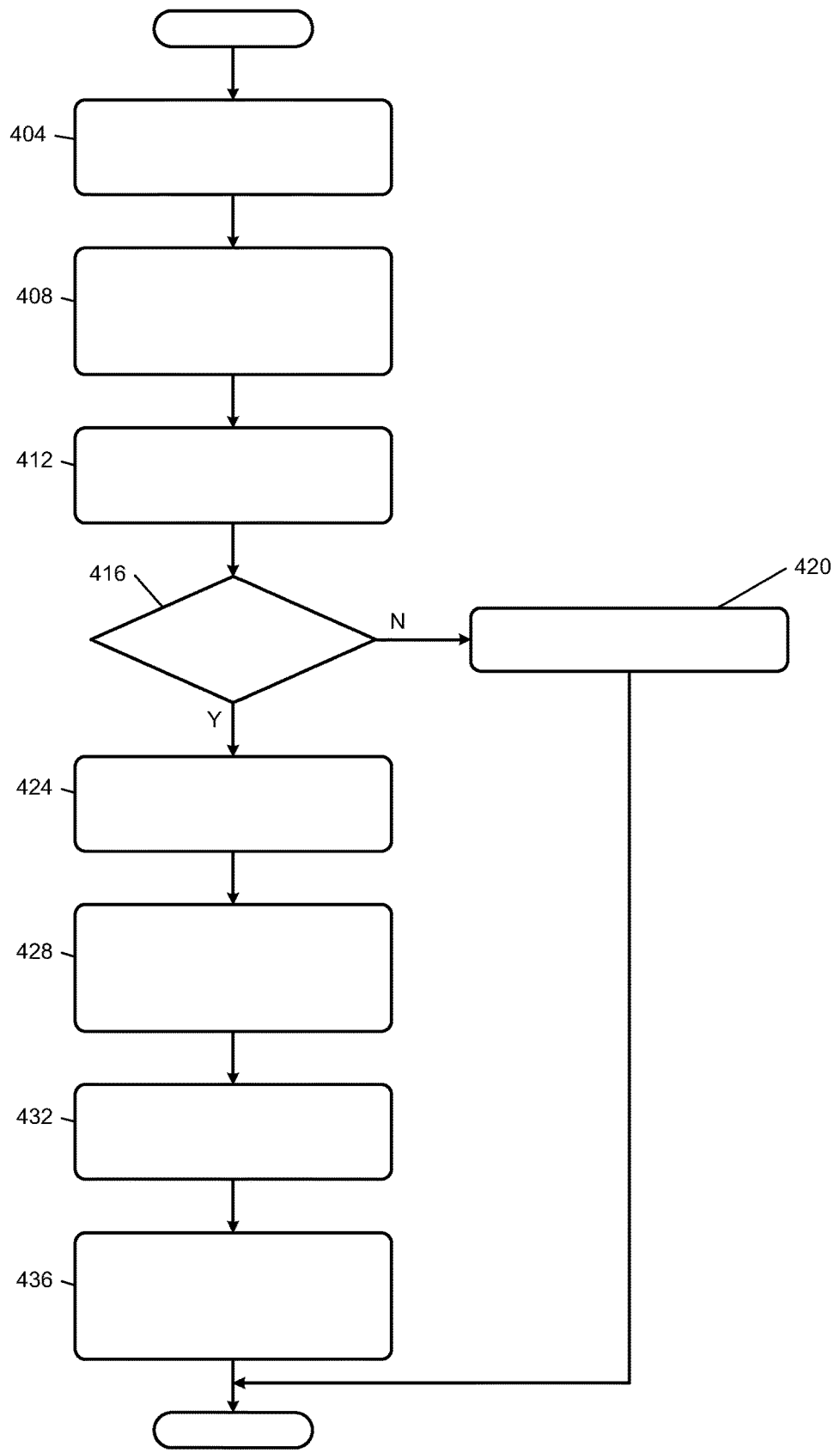
FIG. 5 is a flowchart depicting an example process for executing a remote direct memory access write operation using a mutex lock in the process of FIG. 4.

FIG. 5 is a flowchart depicting an example process for executing a remote direct memory access write operation using a mutex lock in the process of FIG. 4. The process may be performed by, for example, the vehicle electrical architecture 20 of FIG. 1 or the first vehicle control module node 202 and the second vehicle control module node 204 of FIG. 3. At 404, the process begins by the first vehicle control module node application requesting to lock (e.g., obtain) a mutex for a remote memory region (e.g., a memory region of a second vehicle control module node connected via an Ethernet link).

At 408, the mutex client of the first vehicle control module node is configured to interact with a mutex server of the second vehicle control module node, to request access to the mutex lock. The second node mutex server then executes an atomic compare-and-swap (CASP) instruction in an attempt to obtain or lock the mutex.

Control determines at 416 whether the mutex lock was successfully obtained. If not, the mutex server returns a notification of unsuccessful mutex lock acquisition, at 420. If the mutex lock is successfully obtained or locked at 416, control proceeds to 424 to communicate the successful lock of the mutex to the mutex client of the first vehicle control module node.

At 428, the mutex client of the first vehicle control module node is configured to signal a lock acquisition success to the requesting application of the first vehicle control module node. The first node application may then perform any desired read operations (e.g., from the memory region of the second vehicle control module node), and perform any desired computations (such as computations based on data read from the memory associated with the mutex lock), at 432. The first node then performs a safe-guarded RDMA write to the second node memory region, such as a write of local buffer content from the first node to the second node memory region using RDMA.

In some examples, an application of a first vehicle control module node requests to write data to a remote memory region, which is marked as a memory region requiring mutex controlled access coordination. For example, the application may request to lock the remote mutex associated with the desired memory region, such as by requesting an R-mutex client (via a runtime environment interface), to lock a mutex for the desired remote node memory region.

The R-mutex client then interacts with an R-mutex server of the second vehicle control module node (e.g., using RDMA send/receive operations or regular Ethernet communication), to request the desired mutex lock. The R-mutex server may use an atomic CASP instruction to lock the desired mutex lock.

If the mutex lock is successfully obtained, the R-mutex server of the second application node may communicate the successful locking to the R-mutex client of the first vehicle control module node. If the mutex is already locked by the second vehicle control module node (or another node in implementations with more than two nodes), the R-mutex server may indicate an inability to obtain the mutex lock to the R-mutex client. In some examples, the R-mutex server may block until mutex lock can be obtained.

Once the mutex lock is obtained, the R-mutex client may signal success to an application of the first vehicle module node, such as via a runtime environment interface. The application running on the first vehicle control module node may then perform remote read operations and computations as needed. For example, the first vehicle control module node may use its RDMA read module to read content out of the desired memory region of the second vehicle control module node, and into a local buffer of the first vehicle control module node if needed.

The application running on the first vehicle control module node may perform computations that change the content of the local buffer if desired. In another example, the application of the first vehicle control module node may not have a need to read content of the remote memory region into a buffer, and may perform computations that lead to the creation of data in a local buffer. The local buffer will then contain data for writing to the desired memory region of the second vehicle control module node (e.g., second ECU).

The first vehicle control module node may then perform a safeguarded RDMA write of local buffer content to the target remote memory region. For example, the application of the first vehicle control module node may provide a pointer to the local buffer to the RDMA write module. The RDMA write module then checks whether the first vehicle control module node has successfully locked the mutex corresponding to the target remote memory region. This check inhibits or prevents an application which is incorrectly programmed from being able to write to the target remote memory region, without holding the mutex lock corresponding to the target remote memory region. The RDMA write module may then use RDMA write operations to write the local buffer content to the target remote memory region of the second vehicle control module node.

Figure 6:
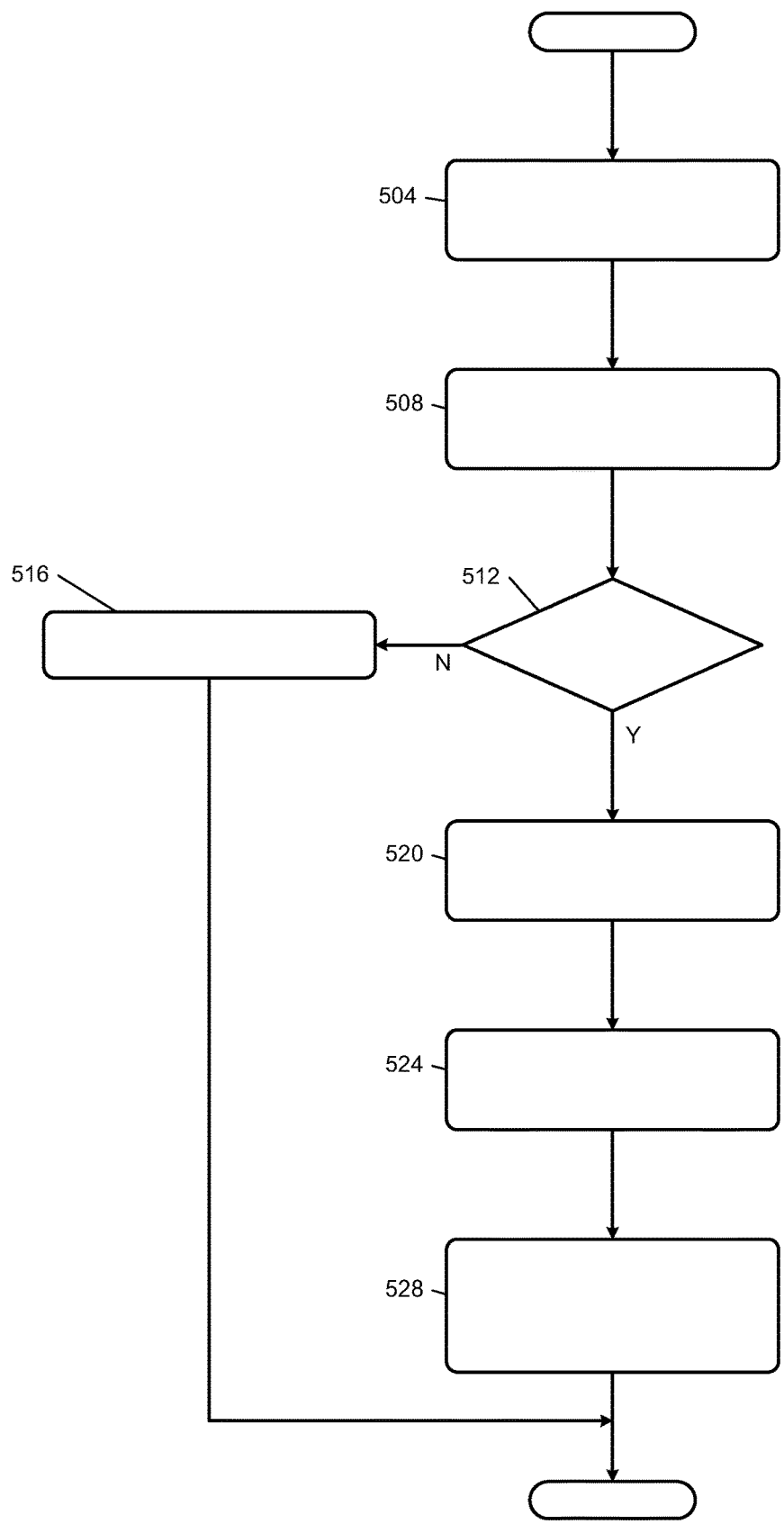
FIG. 6 is a flowchart depicting an example process for executing a local write operation using a mutex lock in the process of FIG. 4.

FIG. 6 is a flowchart depicting an example process for executing a local write operation using a mutex lock in the process of FIG. 4. The process may be performed by, for example, the vehicle electrical architecture 20 of FIG. 1 or the first vehicle control module node 202 and the second vehicle control module node 204 of FIG. 3. At 504, the process begins by an application of the second vehicle control module node requesting to lock a local mutex for a local memory region (e.g., a memory region of the second vehicle control module).

At 508, the mutex server of the second vehicle control module attempts to obtain the mutex lock, such as by executing an atomic compare-and-swap (CASP) instruction. If the mutex lock is not successfully obtained at 512, control proceeds to 516 where the mutex server may return a notification of inability to obtain the mutex lock (such as a notification to the application that the memory region is not currently available for write operations).

If the mutex lock is successfully obtained at 512, the mutex server communicates a successful lock notification to the application of the second vehicle control module node at 520. The application then performs any desired read operations and computations at 524. At 528, the second vehicle control module node performs a write of local buffer content to the target memory region of the second vehicle control module node, which is associated with the mutex lock.

In some examples, an application running on the second vehicle control module node may desire to write data to a memory region which is local to the second vehicle control module node, where the target memory region is marked as a memory region requiring mutex controlled access coordination.

This example case may be similar to the example write request operations illustrated in FIG. 4, but in the example of FIG. 5 the R-mutex server is locally used to obtain a lock on the mutex associated with the local memory region. The second vehicle control module node may then use a local write module to write to the local memory region, and a local read module to read data from the local memory region (e.g., where local read and write operations do not use RDMA).

Figure 7:
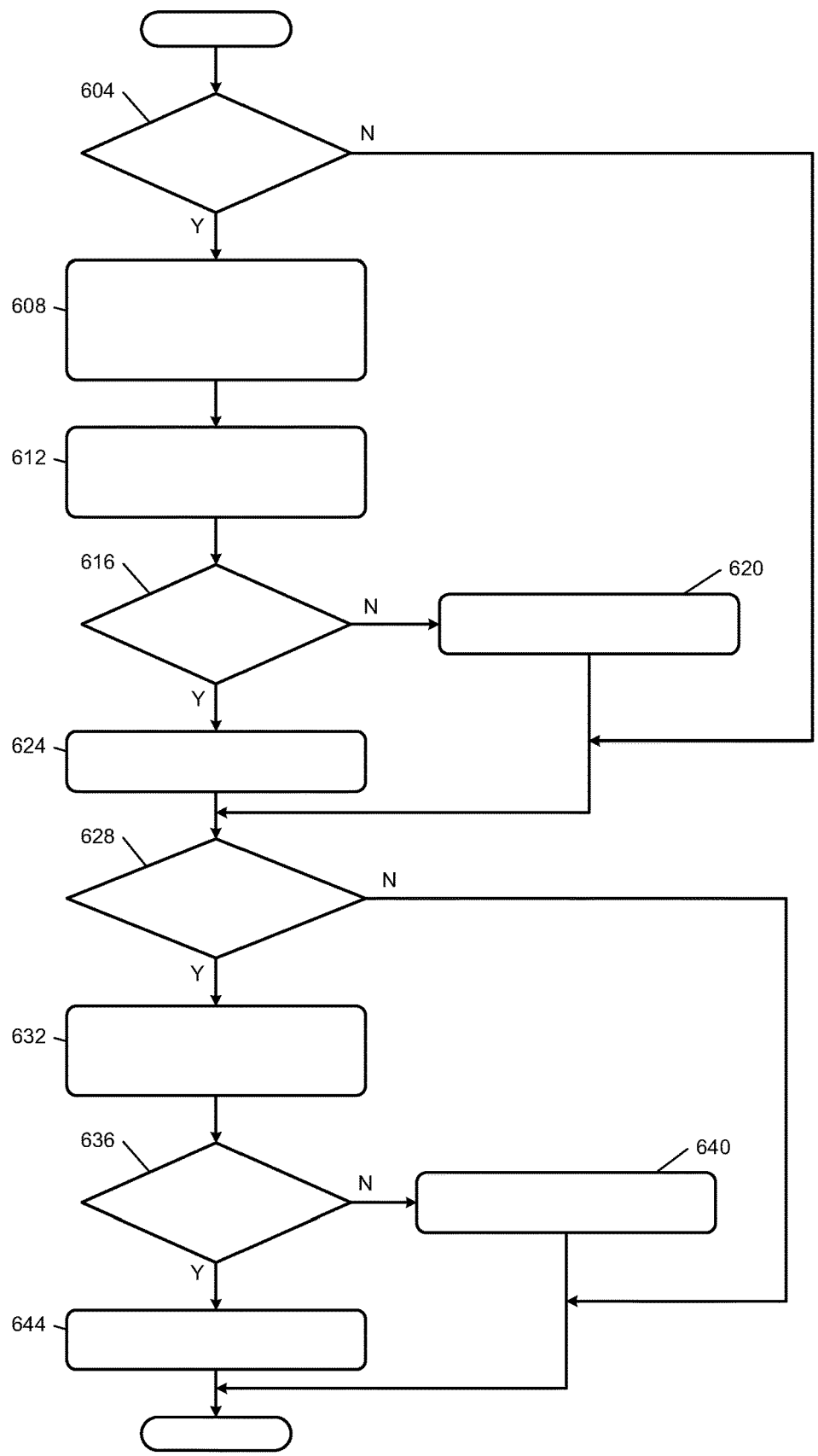
FIG. 7 is a flowchart depicting an example process for executing a remote direct memory access read operation in the process of FIG. 4.

FIG. 7 is a flowchart depicting an example process for executing a remote direct memory access read operation in the process of FIG. 4. The process may be performed by, for example, the vehicle electrical architecture 20 of FIG. 1 or the first vehicle control module node 202 and the second vehicle control module node 204 of FIG. 3. At 604, the process begins by determining whether an application of the first vehicle control module node is requesting a memory read, such as a memory read from a target remote memory region of the second vehicle control module node.

If so, control proceeds to 608 where the mutex client of the first node interacts with a mutex server of the second node to request access to a non-exclusive shared mutex lock associated with the target memory region. The mutex server then uses an atomic CASP instruction to access the shared lock.

If the shared lock is not successfully obtained at 616, the mutex server returns a notification of an inability to obtain the shared lock at 620. If the shared lock is obtained successfully at 616, the application of the first vehicle control module node performs a read operation, such as an RDMA read operation from the target memory region on the second vehicle control module node.

At 628, control determines whether an application on the second vehicle control module node is requesting a memory region. If so, the mutex server of the second vehicle control module node uses an atomic CASP instructions to access the shared lock at 632. Although FIG. 6 refers to first and second vehicle control module nodes, some example embodiments may include more than two nodes that need to read the data and need to obtain the shared lock.

If the shared lock is obtained successfully at 636, the application of the second vehicle control module node performs a local read operation from the target memory region associated with the shared mutex lock. If the shared lock is not obtained at 636, control proceeds to 640 to return an inability to obtain the shared mutex lock.

In some examples, applications running on the first vehicle control module node, or the second vehicle control module node, or applications running on both nodes, may desire to read data from the target memory region, without a need to write data to the target memory region.

While the mutex variable operations described in the examples of FIGS. 5 and 6 use exclusive locks, if a node only needs read access to the target memory region, the node may not require an exclusive mutex lock that would unnecessarily prevent other nodes from reading the same data at the same time. In this example, the node may obtain a shared mutex lock.

Multiple nodes may hold a shared mutex lock at the same time. While a shared mutex lock is held by one or more nodes, no exclusive locks may be obtained for the same memory region resource by any of the nodes. This prevents cases where a node reads data that is modified by a parallel write operation initiated by another node, halfway through the read operation. Remote shared mutex locks may be implemented based on semaphores, mutex variables, etc., following example R-mutex client and R-mutex server atomic operation patterns discussed herein (or other suitable mutex algorithms).

In some implementations, shared mutex locks allow multiple applications on different vehicle control module nodes to read the same data, while inhibiting or preventing data writes to the same memory region. Exclusive locks may allow a single application to write data to a target memory region, while inhibiting or preventing all other applications from reading or writing data to or from the target memory region. Table 1 below illustrates example states for shared and exclusive locks:

TABLE 1

| | | Current state of locking | | |
|---|---|---|---|---|
| | | Unlocked | Shared | Exclusive |
| Requested lock mode | Unlock | | Yes | Yes |
| | Shared lock | Yes | Yes | No |
| | Exclusive lock | Yes | No | No |

Example RDMA communication implementations between different vehicle control module nodes may be used in any suitable example use cases for vehicle controls, such as applications where time critical examples where RDMA read and write operations can help reduce data transfer times. For example, wheel speed latency on an emergency braking application may reduce automated stopping distance by using RDMA read and write operations for reduced latency. In some examples, a one millisecond delay in latency with a control loop of five milliseconds may cause increase in stopping distance by, for example, sixteen centimeters (or greater or lesser distances).

RDMA read and write operations may be used to reduce latency in active damping controls, where shock absorbers on the car are electronically controlled. When traveling on uneven road surfaces, the vehicle may use active damping (e.g., roll and pitch control) to ensure a smooth ride. Latency is directly proportional to the ability to deliver desired control of vertical wheel motion (and consequentially, body motion). In some implementations, a required end-to-end latency may be 600 μs or less, which may include transmitting data from a sensor to a control algorithm processor, and from the control algorithm processor to the actuator.

In other examples, primary and secondary electronic control units (ECUs) may be used for a feature such as brake by wire. Fault detection in the primary ECU, for example, may be conveyed to the secondary ECU faster using RDMA, which may allow the secondary ECU to take over and resume normal operation more quickly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle electrical architecture comprising:
a first vehicle control module node including a first remote direct memory access (RDMA) capable network interface card, a mutex client, and at least one first processor;
a second vehicle control module node including a second RDMA capable network interface card, a mutex server, a memory including multiple defined memory regions, and at least one second processor; and
an Ethernet link in communication between the first RDMA capable network interface card of the first vehicle control module node and the second RDMA capable network interface card of the second vehicle control module node;
wherein the first vehicle control module node is configured to:
receive a write request for a specified one of the multiple defined memory regions of the second vehicle control module node;
communicate with the mutex server of the second vehicle control module node, via the mutex client, to request a mutex lock associated with the specified one of the multiple defined memory regions; and
in response to a notification of the mutex lock being obtained, execute a remote direct memory access write operation to the specified one of the multiple defined memory regions, wherein the mutex client and the mutex server are configured to execute process synchronization for the remote direct memory access write operation without relying on supporting hardware from the first RDMA capable network interface card and the second RDMA capable network interface card.

2. The vehicle electrical architecture of claim 1, wherein the mutex server of the second vehicle control module node is configured to access the mutex lock by executing an atomic operation instruction.

3. The vehicle electrical architecture of claim 2, wherein the mutex server of the second vehicle control module node is configured to communicate a mutex lock unavailable notification to the mutex client of the first vehicle control module node, in response to the atomic operation instruction being unsuccessful.

4. The vehicle electrical architecture of claim 2, wherein:
the mutex server of the second vehicle control module node is configured to communicate a mutex lock success notification to the mutex client of the first vehicle control module node, in response to the atomic operation instruction being successful; and
the mutex client is configured to communicate the mutex lock success notification to an application running on the first vehicle control module node via a memory region interface of the first vehicle control module node.

5. The vehicle electrical architecture of claim 1, wherein the first vehicle control module node is configured to perform at least one read operation from the specified one of the multiple defined memory regions of the second vehicle control module node, prior to executing the remote direct memory access write operation to the specified one of the multiple defined memory regions.

6. The vehicle electrical architecture of claim 1, wherein the first vehicle control module node is configured to:
receive a local write request for a specified one of the multiple defined memory regions of the second vehicle control module node;
access the mutex lock by the mutex server executing an atomic operation instruction; and
in response to a notification of the mutex lock being obtained, execute a local write operation to the specified one of the multiple defined memory regions.

7. The vehicle electrical architecture of claim 1, wherein the first vehicle control module node is configured to:
receive a read request for the specified one of the multiple defined memory regions of the second vehicle control module node;
communicate with the mutex client of the second vehicle control module node, via the mutex server, to request a shared mutex lock associated with the specified one of the multiple defined memory regions; and
in response to a notification of the shared mutex lock being obtained, execute a remote direct memory access read operation to the specified one of the multiple defined memory regions.

8. The vehicle electrical architecture of claim 7, wherein the second vehicle control module node is configured to:
receive a local read request for the specified one of the multiple defined memory regions of the second vehicle control module node;
access the shared mutex lock, via the mutex server; and
in response to a notification of the shared mutex lock being obtained, execute a local read operation to the specified one of the multiple defined memory regions.

9. The vehicle electrical architecture of claim 8, wherein the shared mutex lock is a non-exclusive lock configured to be held by multiple nodes at a same time.

10. The vehicle electrical architecture of claim 1, wherein the second vehicle control module node is configured to:
create multiple memory buffers each associated with a corresponding one of the multiple defined memory regions; and
register each of the multiple memory buffers with the second RDMA capable network interface card.

11. The vehicle electrical architecture of claim 1, wherein the first vehicle control module node is configured to:
create multiple memory buffers each associated with a corresponding one of the multiple defined memory regions; and
register each of the multiple memory buffers with the first RDMA capable network interface card.

12. The vehicle electrical architecture of claim 1, wherein the first vehicle control module node is configured to execute the RMDA write operation to control automated braking of a vehicle including the first vehicle control module node.

13. The vehicle electrical architecture of claim 1, wherein the first vehicle control module node is configured to execute the RMDA write operation to control automated damping of one or more shock absorbers of a vehicle including the first vehicle control module node.

14. The vehicle electrical architecture of claim 1, wherein the first vehicle control module node is configured to execute the RMDA write operation to transmit a fault detection notification to the second vehicle control module node.

15. A vehicle electrical architecture comprising:
a first vehicle control module node including a first remote direct memory access (RDMA) capable network interface card, a mutex client, and at least one first processor;
a second vehicle control module node including a second RDMA capable network interface card, a mutex server, a memory including multiple defined memory regions, and at least one second processor; and
an Ethernet link in communication between the first RDMA capable network interface card of the first vehicle control module node and the second RDMA capable network interface card of the second vehicle control module node;
wherein the second vehicle control module node is configured to:
receive a local write request for a specified one of the multiple defined memory regions of the second vehicle control module node;
access a mutex lock associated with the specified one of the multiple defined memory regions, by the mutex server executing an atomic operation instruction; and
in response to a notification of the mutex lock being obtained, execute a local write operation to the specified one of the multiple defined memory regions, wherein the mutex client and the mutex server are configured to execute process synchronization for the local write operation without relying on supporting hardware from the first RDMA capable network interface card and the second RDMA capable network interface card.

16. The vehicle electrical architecture of claim 15, wherein the first vehicle control module node is configured to:
receive a read request for the specified one of the multiple defined memory regions of the second vehicle control module node;
communicate with the mutex server of the second vehicle control module node, via the mutex client, to request a shared mutex lock associated with the specified one of the multiple defined memory regions; and
in response to a notification of the shared mutex lock being obtained, execute a remote direct memory access (RMDA) read operation to the specified one of the multiple defined memory regions.

17. The vehicle electrical architecture of claim 16, wherein the second vehicle control module node is configured to:
receive a local read request for the specified one of the multiple defined memory regions of the second vehicle control module node;
access the shared mutex lock, via the mutex server; and
in response to a notification of the shared mutex lock being obtained, execute a local read operation to the specified one of the multiple defined memory regions.

18. The vehicle electrical architecture of claim 17, wherein the shared mutex lock is a non-exclusive lock configured to be held by multiple nodes at a same time.

19. The vehicle electrical architecture of claim 15, wherein the second vehicle control module node is configured to:
create multiple memory buffers each associated with a corresponding one of the multiple defined memory regions; and
register each of the multiple memory buffers with the second RDMA capable network interface card.

20. The vehicle electrical architecture of claim 15, wherein the first vehicle control module node is configured to:
create multiple memory buffers each associated with a corresponding one of the multiple defined memory regions; and
register each of the multiple memory buffers with the first RDMA capable network interface card.

* * * * *